United States Patent [19]

Pachaly et al.

[11] Patent Number: 5,346,681

[45] Date of Patent: Sep. 13, 1994

[54] SYNTHETIC ALUMINOSILICATES AND THEIR USE AS HETEROGENEOUS EQUILIBRATION CATALYSTS

[75] Inventors: Bernd Pachaly, Burghausen; Konrad Mautner, Kastl, both of Fed. Rep. of Germany

[73] Assignee: Wacker-Chemie GmbH, Munich, Fed. Rep. of Germany

[21] Appl. No.: 79,428

[22] Filed: Jun. 21, 1993

[30] Foreign Application Priority Data

Aug. 20, 1992 [DE] Fed. Rep. of Germany ....... 4227594

[51] Int. Cl.$^5$ .............................................. C01B 33/26
[52] U.S. Cl. .............................. 423/328.1; 423/330.1; 502/64; 502/66
[58] Field of Search ............................ 502/64, 502, 66; 423/328.2, 330.1

[56] References Cited

U.S. PATENT DOCUMENTS

| | | | |
|---|---|---|---|
| 4,097,412 | 6/1978 | Muller | 502/322 |
| 4,281,194 | 7/1981 | Armor et al. | 564/267 |
| 4,432,956 | 2/1984 | Zarzycki et al. | 501/12 |
| 4,599,437 | 7/1986 | Riederer . | |
| 4,780,436 | 10/1988 | Raatz et al. | 502/74 |
| 5,045,519 | 9/1991 | Meyer et al. . | |
| 5,100,853 | 3/1992 | Thome et al. | 502/71 |

FOREIGN PATENT DOCUMENTS 2527196  5/1983  France .
2639256 10/1989 France .

OTHER PUBLICATIONS

W. Noll, Chemistry and Technology of Silicones, Academic Press, Orlando, 1968, Chapter 5.4.2.2.
M. G. Voronkov et al., The Siloxane Bond, Consultants Bureau, New York, 1978, Chapter 3.12.

Primary Examiner—Anthony McFarlane
Attorney, Agent, or Firm—Martin Connaughton

[57] ABSTRACT

A synthetic aluminosilicate was prepared by (I) forming a gel by hydrolysis, with water or a mixture of water and alkanol, at a pH of 7.0 to 9.5, of (a) 10 to 90 mol percent of monomeric and/or polymeric silicic acid ester and 90 to 10 mol percent of aluminum alcoholate, based on the total amount of silicon and aluminum atoms, and (b) a doping agent selected from a compound of boron or a metal other than aluminum, which is soluble in water, alkanol or a mixture of water and alkanol, in an amount of from 0.1 to 5.0% by weight based on the total weight of the silicon and aluminum compound, and (II) heating the resultant gel to at least 200° C.

6 Claims, No Drawings

SYNTHETIC ALUMINOSILICATES AND THEIR USE AS HETEROGENEOUS EQUILIBRATION CATALYSTS

The present invention relates to synthetic aluminosilicates and more particularly to a process for preparing synthetic aluminosilicates and to their use as heterogeneous equilibration catalysts for organosiloxanes.

BACKGROUND OF THE INVENTION

Equilibration reactions are understood as meaning the re-arrangement of siloxane bonds until an equilibrium is established in the arrangement of siloxane units.

Under the action of suitable catalysts, equilibrium is established between cyclic and linear alkyl- and arylsiloxanes, in which the amount of cyclic oligomers in the case of dimethylsiloxanes is from 15 to 20%. This is described in "J. Burkhardt in Silicone-Chemie und Technologie (Silicone Chemistry and Technology), Vulkan-Verlag, Essen, 1989". Under the action of suitable catalysts, mixtures of siloxanes of different molecular weights can be equilibrated, i.e., their molecular weight distribution can be normalized.

In "The Siloxane Bond, Consultants Bureau, New York, 1978", M. G. Voronkov et al., show that acid clays consisting essentially of aluminosilicates are particularly suitable catalysts for these equilibration reactions, montmorillonites being especially suitable. This is described in "W. Noll, Chemistry and Technology of Silicones, Academic Press, Orlando, 1968".

Compared with homogeneous catalysts, these heterogeneous catalysts have the advantage that they can be removed by filtration, and hence deactivated, when the reaction has terminated. These acid clays, activated by digestion with mineral acids, are used to a large extent in the preparation of silicone oils and silicone polymers. This is described for example in "A. Tomanek, Silicone & Technik (Silicones & Technology), Hauser-Verlag, Munich, 1990" and in U.S. Pat. No. 4,599,437.

Montmorillonites are aluminosilicates containing alkali metals and alkaline earth metals and having a band structure of the approximate composition $Al(Si_2O_5)OH$.

An essential disadvantage of these digested montmorillonites is their content of natural impurities, such as alkali metals, alkaline earth metals, transition metals and sulfur, which lead to contamination of the siloxane products. Consequently, odors, discolorations or chemical changes of an undesirable nature, e.g. elimination of hydrocarbons, occur in the siloxane products.

Condensation and equilibration reactions often take place simultaneously. In particular, the known acid activated clays have a strong condensing action, resulting in an unavoidable increase in the molecular weight of the siloxanes.

Therefore, it is an object of the present invention to provide heterogeneous catalysts for the equilibration of siloxanes. A further object of the present invention is to provide heterogeneous catalysts which have high equilibrating activity coupled with low condensing activity and which do not contaminate the siloxane product.

SUMMARY OF THE INVENTION

The foregoing objects and others which will become apparent from the following description are accomplished in accordance with this invention, generally speaking by providing a process for preparing synthetic aluminosilicates which comprises (I) forming a gel by hydrolysis, with water or a mixture of water and alkanol, at a pH of 7.0 to 9.5, of (a) 10 to 90 mol percent of monomeric and/or polymeric silicic acid ester and 90 to 10 mol percent of aluminum alcoholate, based on the total amount of silicon and aluminum atoms, and (b) a doping agent selected from a compound of boron or a metal other than aluminum, which is soluble in water, alkanol or a mixture of water and alkanol, in which the doping agent is present in an amount of from 0.1 to 5.0% by weight based on the total weight of silicon and aluminum compound, and (II) heating the resultant gel to at least 200° C.

DESCRIPTION OF THE INVENTION

In the process of this invention, the hydrolysis of silicic acid ester and aluminum alcoholate in the preparation of the gel can take place in any order. Preferably, however, a mixture of silicic acid ester and aluminum alcoholate is stirred into a weak basic mixture of alkanol, water and doping agent, giving particularly homogeneous synthetic aluminosilicates.

The hydrolysis rate can be accelerated by a high concentration of water in the mixture of alkanol and water, or by a high pH of this mixture or by a high hydrolysis temperature or a combination of the above.

The proportion of water is preferably at least 5% by weight, preferably at least 20% by weight, based on the mixture of alkanol and water.

The pH of the mixture of alkanol and water after addition of the aluminum alcoholate and the silicic acid ester is preferably from 7.5 to 8.5, and more preferably from 7.8 to 8.2.

The pH required for the hydrolysis can be adjusted with any base which is sufficiently soluble in water or the mixture of water and alkanol. Examples of suitable bases are alkali metal or alkaline earth metal hydroxides or organic bases. Basic nitrogen compounds which are soluble in water or in the mixture of water and alkanol are preferred. Volatile bases which can be removed without leaving a residue when the resultant gel is dried are particularly preferred. Examples of such bases are trimethylamine, triethylamine and especially ammonia.

The hydrolysis is preferably carried out at 0° to 50° C., and more preferably at 15° to 30° C.

Suitable alkanols employed in the hydrolysis are $C_1$ to $C_6$-alkanols. The hydrolysis is preferably carried out in a mixture of water with ethanol and/or methanol.

The monomeric and/or polymeric silicic acid esters preferably have exclusively $C_1$ to $C_6$-alkoxy radicals and have a viscosity of at most 20 mm²/s at 25° C. It is possible to use one particular silicic acid ester or a mixture of different silicic acid esters. The preparation of the silicic acid esters is described in W. Noll, chap. 11. Particularly preferred red silicic acid esters containing from $C_1$ to $C_3$-alkoxy radicals and have a viscosity of from 1 to 5 mm²/s at 25° C. The preferred monomeric silicic acid esters are tetramethyl silicate, tetraethyl silicate and tetraisopropyl silicate.

The aluminum alcoholates preferably have exclusively $C_1$ to $C_6$-alkoxy radicals or phenylate radicals. Preferred aluminum alcoholates are aluminum n-butylate, aluminum secondary butylate, aluminum tert-butylate, aluminum isopropylate and aluminum phenylate and in particular aluminum secondary butylate.

Based on the total amount of silicon and aluminum atoms, it is preferred that from 60 to 80 mol percent of silicic acid ester and 40 to 20 mol percent of aluminum alcoholate, be employed and more preferably from 60 to 70 mol percent of silicic acid ester and 40 to 30 mol percent of aluminum alcoholate.

The doping agents used in the process of this invention are preferably compounds of boron, of alkaline earth metals or of the metals of subgroups II, III, IV, V, VI, VII or VIII of the Periodic Table, preferably compounds of iron, titanium, zirconium, cobalt or nickel. The metals are preferably used as $C_1$ to $C_6$-alcoholates or acetylacetonates.

The doping agent is preferably added in amounts of 0.5 to 3.0% by weight, especially 1.5 to 2.5% by weight, based on the total weight of silicon and aluminum compound.

Examples of $C_1$ to $C_6$-alkoxy radicals on the silicic acid esters, the aluminum alcoholates and the doping agents are the methoxy, ethoxy, n-propoxy, isopropoxy, n-butoxy, isobutoxy, secbutoxy and tert-butoxy radicals, pentoxy radicals such as the n-pentoxy radical, and hexyloxy radicals such as the n-hexyloxy radical.

The alkoxy radicals can be substituted by halogen atoms, although this is not preferred.

Examples of the preferred alkanols used in the process are derived from the $C_1$ to $C_6$-alkoxy radicals listed above.

The gel formed in the process of this invention is separated from the solution in a known manner, such as, for example by filtration, and then preferably dried. Heating preferably takes place at 350 to 800° C, especially at 400 to 600° C.

The synthetic aluminosilicates obtained by the process of this invention are effective catalysts for the equilibration of oligomeric or polymeric organosiloxanes.

Examples of such organo(poly) siloxanes are especially those of the formulas $(R_2SiO)_x$ and $HO(SiR_2O)_nH$ in which R represents a monovalent hydrocarbon radical, a substituted monovalent hydrocarbon radical or hydrogen, with the proviso that at most one hydrogen atom is bonded to one silicon atom, x is an integer with a value of from 3 to 8 and n is an integer with a value of 1, preferably at least 2, up to at most the value corresponding to an average viscosity of at most 1000 mPa·s at 25° C.

Examples of hydrocarbon radicals represented by R are methyl, ethyl, vinyl and phenyl radicals. Examples of substituted hydrocarbon radicals R are especially halogenated hydrocarbon radicals such as the 3,3,3-trifluoropropyl radical and chlorophenyl radicals, and also aliphatic radicals built up from carbon, hydrogen, ether oxygen and fluorine atoms, such as the 1,1,2,3,3,3-hexafluoropropoxypropyl radical and the 1,1,2,2-tetrafluoroethoxypropyl radicals. Because of their availability, at least 80% of the number of hydrocarbon radicals represented by R are preferably methyl radicals.

It is possible to use only one type of organo(poly) siloxane, however, it is also possible to use mixtures of at least two different types of such organo(poly)siloxanes, so that an equilibration of different organo(poly) siloxanes can occur.

The organosiloxanes are preferably cyclic or linear hydrolyzates of dimethyldichlorosilane. In the equilibration, these are optionally used together with endblockers. End-blockers, such as hexamethyldisiloxane and hexamethyldisilazane, are used for example in the preparation of silicone oils from OH-terminal organopolysiloxanes, especially dimethylpolysiloxanes.

The synthetic aluminosilicates obtained from the process of this invention can be used in all processes in which equilibration reactions of organosiloxanes are catalyzed. These equilibration reactions take place for example at a temperature range of from 0° to 180° C., preferably from 20° to 150° C. and more preferably from 80° to 130° C.

Compared with the acid activated clays, the synthetic aluminosilicates obtained from the process of this invention have the advantage that they markedly reduce the condensation action for essentially the same equilibration activity, and they do not contaminate the siloxane product by releasing impurities.

Condensation reactions of organosilicon compounds containing Si-bonded oxygen are especially the reactions of two Si-bonded hydroxyl groups to eliminate water, and also for example the reaction of one Si-bonded hydroxyl group with one Si-bonded alkoxy group to eliminate alcohol, or with Si-bonded halogen to eliminate hydrogen halide.

In the following Examples, unless otherwise specified, (a) all amounts are by weight; (b) all pressures are 0.10 MPa (abs.); and (c) all temperatures are 20° C.

EXAMPLE 1

Preparation of aluminosilicate gels by the sol-gel process

About 100 g of water, 30 g of methanol, 10 ml of 25% ammonia solution and the doping agent shown in Table I were placed in a 250 ml flask equipped with a dropping funnel, a stirrer and a reflux condenser, and a mixture containing 24.3 g of tetraethyl silicate and 14.5 g of aluminum secondary butylate was added.

The resulting pH was approximately 8. The solid was then filtered off and dried. The yield, based on silicon and aluminum compound used, was 95% and the residual moisture content was 1%.

TABLE I

| Example | Amount | Doping Agent | Metal content of gel |
|---|---|---|---|
| (1a) | 0.635 g | iron(III) acetylacetonate | 0.82% |
| (1b) | 0.550 g | titanium(IV) acetylacetonate | 0.71% |
| (1c) | 0.595 g | calcium acetylacetonate | 0.72% |
| (1d) | 0.960 g | trimethylborate | 0.34% |
| (1e) | 0.535 g | zirconium(IV) acetylacetonate | 0.80% |

EXAMPLE 2

Calcination of the doped aluminosilicate gels

The aluminosilicate gels of Examples (1a) to (1e) were calcined (heated) for 5 hrs in a chamber furnace under an air atmosphere at temperatures of from 350 to 1000° C.

EXAMPLE 3

Equilibration of a dimethylpolysiloxane with the doped aluminosilicates prepared in Example 2

About 5 g of a doped aluminosilicate prepared in Example 2 were added in each case to 100 g of a dimethylpolysiloxane mixture consisting of 55 mol percent of cyclic oligomers and 45 mol percent of linear OH-terminal oligomers having an average molecular weight Mw (weight-average) of 3330 and Mn (number-average) of 2400 (polydispersity D=1.38), and the resulting mixture stirred at 90° C.

Samples were taken after 30, 60 and 120 minutes and examined by means of gel permeation chromatography. The results are shown in Table II.

TABLE II

| | Calcination Temperature | 30 minutes % rings | 30 minutes Mw | 30 minutes Mn | 60 minutes % rings | 60 minutes Mw | 60 minutes Mn | 120 minutes % rings | 120 minutes Mw | 120 minutes Mn |
|---|---|---|---|---|---|---|---|---|---|---|
| (3a) Aluminosilicate | 350 | 53 | 3800 | 2580 | 52 | 3770 | 2590 | 50 | 3820 | 2610 |
| (1a) Iron doping | 500 | 25 | 3970 | 2900 | 19 | 4230 | 3020 | 18 | 4230 | 3020 |
| | 800 | 38 | 3530 | 2650 | 29 | 3730 | 2760 | 21 | 4090 | 2950 |
| | 1000 | 47 | 3220 | 2470 | 42 | 3280 | 2510 | 33 | 3620 | 2710 |
| (3a) Aluminosilicate | 350 | 52 | 3530 | 2560 | 51 | 3550 | 2550 | 50 | 3600 | 2590 |
| (1b) Titanium doping | 500 | 49 | 3520 | 2470 | 48 | 3510 | 2470 | 46 | 3470 | 2460 |
| | 800 | 42 | 3530 | 2520 | 38 | 3510 | 2530 | 34 | 3560 | 2580 |
| | 1000 | 50 | 3470 | 2450 | 49 | 3390 | 2420 | 44 | 3530 | 2530 |
| (3a) Aluminosilicate | 350 | 50 | 3500 | 2460 | 50 | 3440 | 2440 | 49 | 3490 | 2470 |
| (1c) Calcium doping | 500 | 51 | 3460 | 2460 | 50 | 3320 | 2380 | 48 | 3400 | 2430 |
| | 800 | 48 | 3320 | 2430 | 46 | 3460 | 2470 | 43 | 3340 | 2440 |
| | 1000 | 51 | 3350 | 2350 | 51 | 3360 | 2400 | 51 | 3370 | 2420 |
| (3a) Aluminosilicate | 350 | 51 | 3480 | 2530 | 50 | 3530 | 2570 | 48 | 3650 | 2630 |
| (1d) Boron doping | 500 | 50 | 3450 | 2450 | 49 | 3470 | 2470 | 47 | 3420 | 2420 |
| | 800 | 51 | 3450 | 2470 | 50 | 3430 | 2470 | 49 | 3510 | 2520 |
| | 1000 | 52 | 3420 | 2440 | 51 | 3450 | 2500 | 50 | 3460 | 2460 |
| (3a) Aluminosilicate | 350 | 48 | 3270 | 2510 | 47 | 3300 | 2520 | 47 | 3290 | 2520 |
| (1e) Zirconium doping | 500 | 49 | 3230 | 2470 | 46 | 3300 | 2510 | 44 | 3500 | 2640 |
| | 800 | 37 | 3470 | 2630 | 32 | 3580 | 2700 | 26 | 3770 | 2800 |
| | 1000 | 46 | 3310 | 2520 | 45 | 3280 | 2510 | 44 | 3300 | 2520 |

The lower the proportion of rings in the samples, the higher the equilibrating activity of the synthetic aluminosilicate. The increase in the values of Mw and Mn are a measure of the condensation occuring as a secondary reation.

EXAMPLE 4

Equilibration of a dimethylpolysiloxane with a technical-grade acid clay

A Tonsil ® Optimum FF (manufactured by Südchemie AG, Munich) was used as the equilibration catalyst in accordance with the procedure of Example 3. Tonsil ® Optimum FF is regarded as a particularly active equilibration catalyst. The results are shown in Table III.

TABLE III

| Example | | % rings | Mw | Mn |
|---|---|---|---|---|
| (4a) | 30 minutes | 17 | 7600 | 4710 |
| | 60 minutes | 14 | 7910 | 4830 |
| | 120 minutes | 15 | 8270 | 4960 |
| (4b) | 30 minutes | 16 | 6740 | 4303 |
| | 60 minutes | 15 | 7130 | 4470 |
| | 120 minutes | 15 | 7490 | 4540 |

EXAMPLE 5

Equilibration of a dimethylpolysiloxane with iron-doped aluminosilicate

An iron-doped aluminosilicate was calcined at 450, 550, 650 and 750° C. in accordance with the procedure of Examples 1 and 2 and used as an equilibration catalyst according to Example 3. The results are shown in Table IV.

TABLE IV

| Calcination temperature | | % rings | Mw | Mn |
|---|---|---|---|---|
| 450 | 30 minutes | 23 | 4410 | 3030 |
| | 60 minutes | 17 | 4660 | 3150 |
| | 120 minutes | 16 | 4730 | 3190 |
| 550 | 30 minutes | 23 | 4440 | 3070 |
| | 60 minutes | 18 | 4740 | 3230 |
| | 120 minutes | 16 | 4870 | 3300 |
| 650 | 30 minutes | 29 | 4010 | 2810 |
| | 60 minutes | 21 | 4330 | 2990 |
| | 120 minutes | 17 | 4550 | 3110 |
| 750 | 30 minutes | 35 | 3740 | 2690 |
| | 60 minutes | 26 | 4070 | 2890 |
| | 120 minutes | 21 | 4340 | 3020 |

What is claimed is:

1. A process for preparing synthetic aluminosilicates, which comprises (I) forming a gel by hydrolysis, with water or a mixture of water and alkanol, at a pH of 7.0 to 9.5, of (a) 10 to 90 mol percent of monomeric and/or polymeric silicic acid ester and 90 to 10 mol percent of aluminum alcoholate, based on the total amount of silicon and aluminum atoms, and (b) a doping agent, which is a compound of boron or a metal other than aluminum, which is soluble in water, alkanol or a mixture of water and alkanol, in an amount of from 0.1 to 5.0% by weight based on the total weight of the silicon and aluminum compound, separating the gel from the solution, drying the gel, and (II) heating the previously dried gel to at least 200° C.

2. The process of claim 1, wherein a mixture of silicic acid ester and aluminum alcoholate is mixed with a weak basic mixture of alkanol, water and doping agent.

3. The process of claim 1, wherein the pH is adjusted with a basic nitrogen compound which is soluble in water or in the mixture of water and alkanol.

4. The process of claim 1, wherein the hydrolysis is carried out in a mixture of water with ethanol and/or methanol.

5. The process of claim 1, wherein the doping agent is of a metal compound selected from the group consisting of iron, titanium, zirconium, cobalt and nickel.

6. The process or claim 1, wherein the gel is heated to 350 to 800° C.

* * * * *